Nov. 21, 1944.   C. F. HUTCHINGS   2,363,422
PROTECTING LIGHT TRANSMITTING ELEMENT
Filed July 6, 1942

CHARLES FRANKLYN HUTCHINGS
INVENTOR
BY
ATTORNEYS

Patented Nov. 21, 1944

2,363,422

UNITED STATES PATENT OFFICE 2,363,422

PROTECTING LIGHT TRANSMITTING ELEMENTS

Charles Franklyn Hutchings, Perinton, N. Y., assignor to Bausch & Lomb Optical Company, Rochester, N. Y., a corporation of New York Application July 6, 1942, Serial No. 449,884

2 Claims. (Cl. 2—14)

My invention relates to light transmitting elements used in ophthalmic and optical devices and more particularly has reference to means for protecting the surfaces thereof from dirt, dust and scratches.

One object of the invention is to protect the surfaces of a light transmitting member from dirt, dust and accidental abrasion by the use of sheets of covering material which are removably adhered to the parts of these surfaces used for vision. Another object is to provide each of the transmitting surfaces of a light transmitting element, which is adapted to be carried in a mount, with a removable covering member which protects the surface prior to mounting the element, which does not interfere with the mounting of the element, which until removal protects the surface and which is removable from the element without necessitating the unmounting of the latter. A further object of my invention resides in the combination of an ophthalmic mounting and an eyepiece therefor which has protected light transmitting faces.

These and other objects and advantages reside in certain novel features of construction, arrangement and combination of parts as will be hereinafter more fully set forth and claimed.

To make the invention more clearly understood, I have shown means in the accompanying drawing for carrying the same into practical effect. In the drawing, wherein like reference numerals refer to similar parts throughout the several views.

It has been heretofore proposed to form light transmitting members, such as lenses, eyepieces and the like, of transparent plastic material. Material of this nature posseses the characteristics of attracting lint, dirt and dust which accumulate on the surfaces thereof. Also plastic material is relatively soft and becomes easily scratched or abraded in handling.

Plastic material is adapted for many ophthalmic and optical purposes, for example, to form eyepieces for protecting goggles. However, under customary handling practices, elements of this character would reach the user in an unsightly condition due to the accumulation of foreign substances thereon and possibly so badly scratched as to make their employment undesirable.

To ameliorate these just mentioned difficulties, I use sheets of covering material which are removably engaged by a suitable adhesive to the light transmitting faces of the element to be protected and allow the same to remain thereon until the element is put to its intended use. In illustrating this practice, I have shown my invention as applied to a protective goggle which is of well known construction and which employs an eyepiece or lens blank 10 of conventional form.

Figure 1:
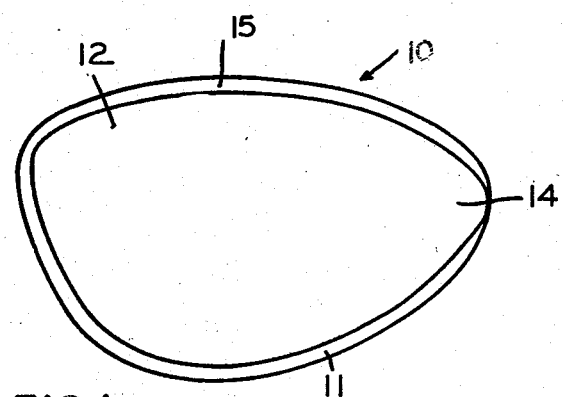
Figure 1 is a plan view of a light transmitting element, such as an ophthalmic eyepiece, used in my invention.
Figure 2:
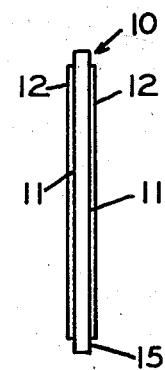
Figure 2 is an end elevation of the element shown in Figure 1.

The eyepiece 10, shown in Figures 1 and 2, is cut from sheet material and has the polished and opposite light transmitting faces 11. When the eyepiece 10 is maintained in a flat position, the faces 11 are substantially parallel. Preferably, the eyepiece is formed of suitable transparent plastic material although the scope of the invention comprehends the formation of the eyepiece of any transparent material including glass. At the same time, it is desirable, where the eyepiece 10 is to be bent into a curved shape, to employ material of a flexible character.

For protecting the faces 11, I make use of sheet material in the form of covering members 12, each of which is applied directly to a face 11 of the eyepiece. The material forming the protective covering members 12 is of a character which is impervious to or which will resist dirt and similar foreign substances so that the covered area of the eyepiece will be kept free of the same. Also the sheet covering material is of a character which will resist abrasion so as to prevent the light transmitting faces from being accidentally scratched. In addition, covering material of a flexible character is chosen so that it may be equally well employed without damage to the material on a light transmitting member having curved surfaces or on such a member having flat surfaces which are to be bent into a curved shape after the application of the covering material.

Each protective covering member 12 is secured or engaged to a face of the eyepiece by a suitable adhesive. Preferably, the covering members are formed of fibrous sheet material, one side of which is coated with a pressure sensitive adhesive so that the covering sheet may be adhered to a surface with slight pressure. An advantage in using a pressure sensitive adhesive resides in the fact that it permits a covering member 12 to be readily removed by merely stripping or peeling the same from the surface to which it is applied. The adhesive is of a character which will not damage the surface to which it is adhered and on removal of the covering member will leave such surface in a clean condition and ready for use. If desirable, the sheet material used for the protective covering members 12 may be coated with a reusable adhesive to permit the members 12 to be reapplied to the faces 11.

Sheet material having a pressure sensitive adhesive on one side thereof is well known to the art and needs no detailed description. While such type of protective sheeting is preferred, it is to be noted that my invention, in its broadest aspect, includes the use of sheeting which is secured to a surface by other than pressure sensitive adhesives.

Each covering member 12 has an outline which simulates that of a face 11 of the eyepiece 10 and may be provided at one side, generally on the temple side, with an extension portion 14 which serves as a tab or gripping means used to facilitate the stripping of a covering member from the eyepiece. In addition, the area of each covering member 12 is less than the area of the face that it is to cover. This permits a protective covering member 12 to be located on each face 11 so that its edge is approximately symmetrically located with respect to the edge of such face. As a result, there is provided an uncovered outer section or margin 15 which borders the edge of each face 11. This outer section extends substantially around each face of an eyepiece to leave a relatively large inner section on the face to which the covering is applied, the uncovered section 15 being interrupted only when a tab 14 is engaged with the eyepiece. The inner section is the usable portion of the eyepiece, that is to say, the portion through which light rays are adapted to pass.

The uncovered sections 15 left on faces 11 are adapted to be engaged between the seat portion of a mounting and the flange portion of a cooperating bezel. By suitable selection of the area for each covering member 12, the margin 15 on each face is made wide enough to extend inside of the mounting member which engages it so as to allow ready removal of the covering member 12 from an eyepiece carried in a mounting. Obviously, no attention need be given to preserving the optical qualities and appearance of the peripheral sections 15 on an eyepiece as these sections are not intended to transmit light and are adapted to be engaged between and to be covered by mounting members.

In instances where the covering members 12 are each provided with a tab portion 14, these tabs are pulled or rolled back from the edge of the eyepiece preparatory to mounting the latter. By this expedient, each covering member 12 remains unengaged between the mounting members which support the eyepiece. After insertion of an eyepiece within a mount, the tab portions 14 may be left rolled back, or may be turned under, or may be unrolled and pushed towards their initial positions and into contact with the portions of the mounting members which are engaged with the edges of the eyepiece.

Figure 3:
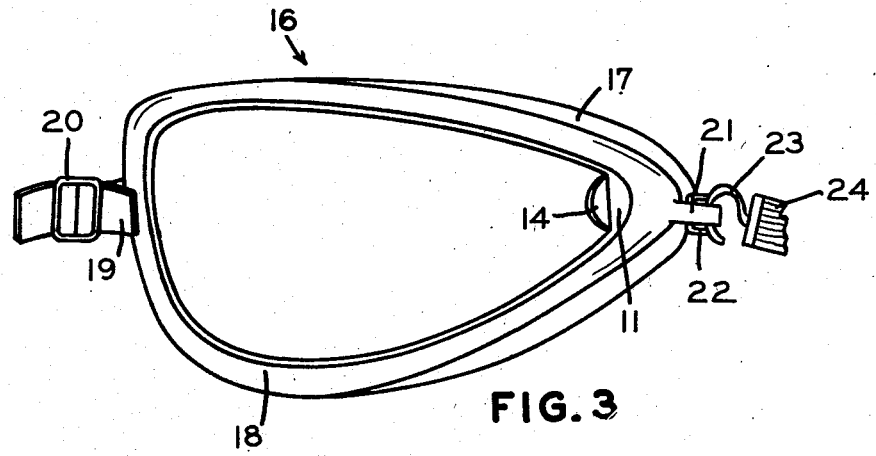
Figure 3 is a plan view showing the light transmitting element of Figures 1 and 2 employed with an ophthalmic mounting.

Figure 3 illustrates a covered eyepiece carried in a well known ophthalmic mounting 16 such as used in protection goggles and provides a simple means for guarding the eyepieces of assembled goggles against harm prior to use of the goggles. The mounting 16 comprises an eyecup 17 and cooperating bezel 18 which are hinged together at their nasal side by a flexible and adjustable bridge connection which secures the mounting of Figure 3 to a second similar mounting. These connection and hinge means employ a flexible strap 19 which extends through openings in the eyecup and bezel of each mounting of a pair of goggles and also through a conventional adjusting buckle 20.

At the temple side of each bezel 18 there is a lug 21 which has a hasp 22 pivoted thereon for latching engagement with a head band post on the temple side of the eyecup for the bezel. Each hasp is retained in engagement with its head band post by a resilient ring 23 which is removably inserted within an opening in the head band post. A ring 23 for each mounting is secured to an end of a head band 24 used with the goggles.

To insert an eyepiece in a mounting 16, the head band 24 and ring 23 are disengaged and hasp 22 is moved to unlatch the bezel and eyecup. This permits the mounting to be opened on swinging the bezel 18 away from its eyecup 17 about the hinge at the nasal end of the mount.

An eyepiece 10 may have its covering members 12 removed before mounting but preferably the covering members are left thereon to facilitate mounting while affording protection to the eyepiece. In the latter instance, when tabs 14 are provided on the covering members, the tabs are rolled back in the manner shown in Figure 3. With the tabs in this position, the eyepiece is seated within the interior of the bezel of the mounting and the bezel is swung about its hinge into engagement with its eyecup to which the bezel is latched. It is to be noted that each covering member 12 lies within the edge of the mounting member in contact with the eyepiece face to which the covering member is applied. By this construction, the covering members are readily removable from the faces they cover.

The covering members 12 may be peeled from the seated eyepiece or they may be left thereon in the event that the assembled goggles are to be stored. Where the latter is the case, tabs 14 may remain in rolled condition or as heretofore noted, each tab may be turned under itself or may be unrolled to recover the eyepiece and overlie a portion of its adjacent mounting member 17 or 18. Whatever disposition is made of the tabs when the covering members 12 remain on a mounted eyepiece, it is to be observed that the covering members mask substantially the entire inner section or usable light transmitting portion of each face to which they are applied. Thus, the area of each eyepiece face which is confined within the contacting portion of a mounting member 17 or 18 will be effectively guarded from the collection of dirt and dust and against damage by accidental scratching.

The covering members 12 are particularly useful in protecting the eyepieces in goggles or other ophthalmic mountings against harm received from general handling operations, such as assembly, shipment, storage and the like, encountered prior to placing the mountings into use. As intimated, the goggles are made ready for use by stripping away the covering members 12, whereupon eyepieces with substantially clean and unscratched surfaces will be presented.

An important feature of my invention resides in the application of covering members to unmounted light transmission members such, for example, as eyepieces 10. This expedient permits one or more eyepieces to be conveniently carried, for example in a coat pocket, without fear of harming an eyepiece. To put such an eyepiece to use, it is merely necessary to remove the eyepiece it is desired to replace, insert the extra eyepiece in the mounting and peel the covering members from the eyepiece.

Because flexible covering material is employed, it is possible to protect light transmitting members which are flat in form and which are themselves of flexible character with the advantages and benefits attendant to the packing, shipping, storing and carrying of articles having flat rather than curved surfaces.

From the foregoing, it will be appreciated that I have attained the aims and objects of my invention in that I have provided simple yet effective means for protecting the usable transmitting surfaces of finished light transmitting members from acquiring a blemished appearance, in the course of the handling they receive prior to their employment, by means of inexpensive covering material of a character which is easily applied and removed from such surfaces.

I claim:

1. A new article of manufacture comprising a lens element adapted to be mounted in a holder whereby the peripheral portions of each face thereof are contacted by said holder; and a flexible abrasion resisting member removably secured to each face of said element to protect the same against damage by abrasion, said member being substantially impervious to dust and dirt and covering substantially the entire face of said lens not contacted by said holder; and means integral with each member and forming a manually graspable tab for completely removing the member from said face after the lens has been mounted in said holder.

2. An eye protecting device comprising a lens; an eyecup; a bezel; means for clamping said lens between said eyecup and bezel with the peripheral portions of the two faces thereof engaged by said eyecup and bezel; means for protecting the faces of said lens from dirt, dust and scratches prior to the use of the device, said means comprising a flexible abrasion resisting sheet covering all but the engaged peripheral portions of each face, each sheet being adhesively secured to a face and removable therefrom; and means, integral with each sheet, forming a tab which may be manually grasped by a user for stripping the sheet from the face of the lens.

CHARLES FRANKLYN HUTCHINGS.